United States Patent
Hijikata et al.

(10) Patent No.: US 7,490,090 B2
(45) Date of Patent: Feb. 10, 2009

(54) INFORMATION EXTRACTION SYSTEM, INFORMATION PROCESSING APPARATUS, INFORMATION COLLECTION APPARATUS, CHARACTER STRING EXTRACTION METHOD, AND STORAGE MEDIUM

(75) Inventors: Yoshinori Hijikata, Yamato (JP); Yoshinori Aoki, Yokohama (JP); Amane Nakajima, Machida (JP)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 11/175,095

(22) Filed: Jul. 5, 2005

(65) Prior Publication Data

US 2005/0246348 A1 Nov. 3, 2005

Related U.S. Application Data

(62) Division of application No. 09/746,236, filed on Dec. 22, 2000, now Pat. No. 6,934,750.

(30) Foreign Application Priority Data

Dec. 27, 1999 (JP) ............................ 11-371347

(51) Int. Cl.
*G06F 7/00* (2006.01)

(52) U.S. Cl. ........................................ 707/10; 707/531
(58) Field of Classification Search ............... 707/10
See application file for complete search history.

(56) References Cited

U.S. PATENT DOCUMENTS

| 5,343,401 | A | * | 8/1994 | Goldberg et al. ............ 700/138 |
| 5,430,808 | A | * | 7/1995 | Baird et al. ................. 382/176 |
| 5,598,187 | A | | 1/1997 | Ide et al. ..................... 345/158 |
| 5,647,021 | A | * | 7/1997 | Baird et al. ................. 382/176 |
| 5,864,789 | A | * | 1/1999 | Lieberman et al. ............ 704/9 |
| 5,900,005 | A | * | 5/1999 | Saito .......................... 715/531 |
| 5,907,630 | A | * | 5/1999 | Naoi et al. .................. 382/173 |
| 6,138,155 | A | * | 10/2000 | Davis et al. ................. 709/224 |
| 6,249,606 | B1 | | 6/2001 | Kiraly et al. ................ 382/195 |
| 6,631,345 | B1 | | 10/2003 | Schumacher et al. ........... 709/2 |
| 6,704,771 | B1 | | 3/2004 | Gough et al. ............... 709/206 |
| 6,735,632 | B1 | | 5/2004 | Kiraly et al. ............... 709/229 |

* cited by examiner

*Primary Examiner*—Pierre M. Vital
*Assistant Examiner*—Truong V Vo
(74) *Attorney, Agent, or Firm*—Scully, Scott, Murphy & Presser, P.C.; Lisa M. Yamonaco

(57) ABSTRACT

The present invention permits users to obtain detailed information concerning those portions of web contents in which they are most interested and provides an information extraction system. In an embodiment, the information extraction system comprises a server and a client, connected via a communication network, wherein the server provides a data file for a client to browse; and wherein the client includes a browser for displaying the contents of the data file that is received from the server via the communication network, an operation event detection analyzer for detecting a predetermined specific operation based on a user's operation when the user reads the contents of the data file displayed by the browser, and a text extractor for extracting information that is displayed at a location whereat the specific operation that is detected by the operation event analyzer is performed on a display screen of the browser.

5 Claims, 13 Drawing Sheets

Program list

```
1: function getSelectedText(sl)
2: {
3:     tr=sl.createRange();
4:     return tr.text
5: }
```

Fig. 3

Program list

```
1:function getLinkTagText(anchor)
2:{
3:      return anchor.innerText
4:}
5:
6:function getLinkText(x, y)
7:{
8:      tr=document.body.createTextRange();
9:      tr.moveToPoint(x, y);
10:     changeTaxtRange(tr);
11:     return tr.text;
12:}
```

| leftchar2 | centerchar2 | | rightchar2 |
|---|---|---|---|
| Th[i]s dog ba[r]ks at p[o]s[t]men. because he | | | |
| en[j]oys their [r]fright[e]ned faces. | | | |
| leftchar1 | centerchar1 | | rightchar1 |

Program list

```
1: function getTracedText (x, y, up)
2: {
3:        tr=body.createTextRange ();
4:        tr.moveToPoint (x, y);
5:        if (up==true)
6:        {
7:                centerchar1=tr.text;
8:                tr.move (CMOVE);
9:                rightchar1=tr.text;
10:               tr.move (-2*CMOVE);
11:               leftchar1=tr.text;
12:               i=PMOVE;
13:               while (i<Um)
14:               {
15:                       tr.moveToPoint (x, y-i);
16:                       centerchar2=tr.text;
17:                       tr.move (CMOVE);
18:                       rightchar2=tr.text;
19:                       tr.move (-2*CMOVE);
20:                       leftchar2=tr.text;
21:                       if (centerchar1!=centerchar2|
                              |rightchar1!=rightchar2|
                              |leftchar1!=leftchar2)
22:                               break;
23:                       i+PMOVE
24:               }
25:               tr.move (CMOVE);
26:       }
27:       changeTextRange (tr);
28:       return.text;
29: }
```

Fig. 8

INFORMATION EXTRACTION SYSTEM, INFORMATION PROCESSING APPARATUS, INFORMATION COLLECTION APPARATUS, CHARACTER STRING EXTRACTION METHOD, AND STORAGE MEDIUM

This application is a divisional of application Ser. No. 09/746,236 filed Dec. 22, 2000 issued U.S. Pat. No. 6,934,750.

FIELD OF THE INVENTION

The present invention relates to an information processing method for monitoring the manipulation by a user of data on the screen of a computer display device, and for obtaining other related information.

BACKGROUND ART

Because the commercial use of the Internet, such as for on-line shopping or for the dissemination of advertising material using banner ads, has become so popular, there is great interest in improving and maximizing the effects produced by this Internet application. Web site managers perform research to obtain the reactions of users (web audience ratings) to web page content, and the results provided by the research are reflected in the subject matter published on web pages or in the design of web sites, or are used for One-to-One marketing.

In order to obtain information concerning the web site subjects or themes users are most attracted to, conventional web audience rating research methods include the provision of questionnaires that site visitors are requested to complete, and means for garnering browser access information, including page display time and the number of page visits, that is subsequently used to prepare estimated user reaction profiles. The access information referred to here is the number of HTTP access requests (the number of hits) received by a server, and other information concerning the browsing of specific web contents that are acquired by a client.

According to the web audience rating method according to which users are requested to complete questionnaires, the research is conducted by asking the users for informative entries. Specifically, a questionnaire page, for example, is prepared in advance for inclusion in web contents, so that users can select interesting topics and keywords. Either this, or distributed across web pages are buttons labeled "Interesting" or "Boring" that viewers are invited to select and click on. According to this method, since the information is obtained as a result of informative input operations performed by users, the obtained information can be used to very reliably track user interest trends.

As one type of information that can be obtained by a server for use in web audience rating research, the count of HTTP access requests (the number of hits) issued for web page contents is heavily relied on. When a web page is available and can be read using a web browser, and when an image is embedded in a web page or framing is employed, the number of hits received for the specific page is counted. In this case, a web server does not accept an HTTP access request when it is moving from one set of web page contents to another.

According to this method, all the content (resource) accesses initiated by a user can be recorded. And when this data is combined with information concerning the resource type (HTML files, images, etc.) involved, the length of time the user spent viewing the predetermined web contents can be estimated.

Since a client can monitor the state of a window that is displayed by a web browser, a client is able to obtain more detailed information than is a server. For example, a client can measure the display time for each page, and for windows can record and examine all changes in location and all sizes and resolutions used for focusing, while at the same time recording keywords selected by a user's manipulation of a data entry device. Additionally, the browsing history of a user can be recorded, without it being limited to a specific web site. Based on the information obtained by employing such a method, user interest trends can, to a degree, be estimated.

In addition, available for use for research are the search engines that users employ to obtain desired information. When using a search engine, a user enters a keyword and clicks on a start button or presses enter, and the search engine then scans a number of web pages for the keyword. Subsequently, if web pages containing the keyword are found, the search engine displays them in a listing. For this process, however, because of the huge number of web pages that are available, it is important that some restriction be applied that can appropriately reduce the number of pages scanned. As a technique for accomplishing this, of the pages listed as a result of one search a user selects a new keyword from a page that best matches his or her interest, and uses the new keyword to initiate another search. In this case, by using a keyword extracted from a document that the user selected as the one that most nearly matched the purpose of the search, the search conditions are automatically changed. Thus, the trend corresponding to of the user's interest will be reflected in the search results. In this case, a keyword that is employed is one that is representative of the entire page that is selected.

Problems Solved by the Invention

However, when information concerning user interests, such as the subject and the theme to which a user's attention is drawn, is acquired by using a conventional web audience rating search or by using a conventional search engine, the amount and reliability of the data obtained are not satisfactory. Since when employing the method according to which users are requested to complete questionnaires, the work involved in filling out the questionnaires is imposed on the users, a high response rate can not be obtained. Similarly, while taking into consideration the load that is to be imposed on users, it is difficult to issue a complicated questionnaire in which an evaluation is requested for each item, such as each sentence, appearing on a page. Further, to request the questionnaire, pages and buttons for the questionnaire must be prepared, so that obtaining information concerning arbitrary web contents is not an easy task.

According to the method for estimating the audience rate by using the information acquired by the server machine or the client machine, the information obtained by the server consists simply the number of hits web contents receive, as described above. From this, the time a user spent viewing predetermined web contents can be estimated, but detailed information, such as which web page the user read and the time the user spent reading it, can not be obtained for each web page.

These data could be acquired, however, were a client machine capable of monitoring the state of a window that is displayed by a web browser. But since means for monitoring a web browser would have to be mounted on a client machine as an application program or as a proxy server, and since control of the monitoring operation would have to be exercised from outside the web browser, the data structure of a web page can not be accessed. As a result, the manipulation of an object in an HTML document by a mouse can not be recorded, and thus, detailed information, such as which portion of a web page a user is particularly interested in, can not be acquired.

A method for accessing information acquired and presented by a web browser can be one for which a Java applet is used for mounting the web contents. However, since with this method only the contents of the Java applet could be obtained, it is not appropriate for application for a common web page.

Further, as is described above, according to the method for changing the search conditions for the operation of a search engine based on an evaluation that is made of a user, a keyword used for this purpose is extracted from a document that constitutes a target web page. Thus, a portion (a sentence or a word) that the user pays particular attention to in the document can not accurately be reflected, in detail, by the search condition.

SUMMARY OF THE INVENTION

To resolve the above technical shortcomings, it is one object of the present invention to eliminate the need for clear input by users, and to permit users to obtain detailed information concerning those portions of web contents in which they are most interested.

Further, it is another object of the present invention to extract detailed information concerning operations performed by users, including operations involving the use of web browsers, so that this information will be available and can be used when user interest trends are being plotted. These and other objects of the present invention are achieved as subsequently described.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 3 is a diagram for explaining a program required when dynamic HTML is employed to carry out the text extraction process of the text extractor 30 when text selection is performed;

FIG. 5 is a diagram for explaining a program required when dynamic HTML is employed to carry out the text extraction process of the text extractor 30 when pointing to a link is performed;

FIG. 7 is a diagram for explaining the process for identifying the line immediately above the line the mouse pointer overlaps during a tracing and reading operation;

FIG. 8 is a diagram for explaining the text extraction process when a tracing and reading operation is performed;

DESCRIPTION OF THE INVENTION

Figure 1:
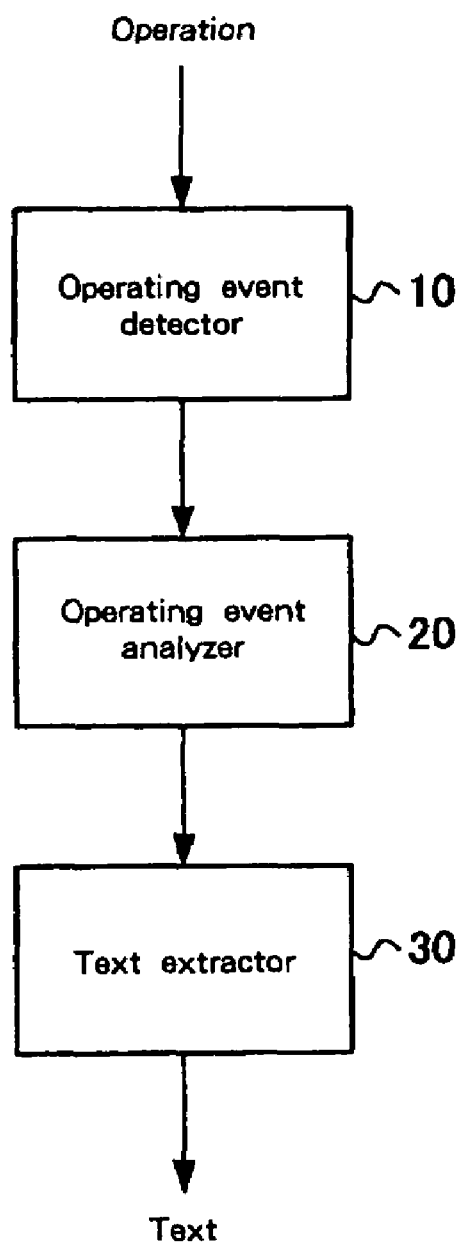
FIG. 1 is a diagram for explaining the overall arrangement of an information extraction system according to an example embodiment of the present invention.

To achieve the above objects, according to the present invention, an information extraction system comprises a server and a client, connected via a communication network, wherein the server provides a data file for a client to browse; and wherein the client includes browsing means for displaying the contents of the data file that is received from the server via the communication network, operation detection means for detecting a predetermined specific operation based on a user's operation when the user reads the contents of the data file displayed by the browsing means, and means for extracting information that is displayed at a location whereat the specific operation that is detected by the operation detection means is performed on a display screen of the browsing means.

According to the present invention, an information extraction system comprises: a web server for storing web contents; and a client for receiving the web contents from the web server, via a communication network, and for displaying the web contents, the client including an operating event detection function for detecting, as a manipulation event, an operation performed by a user on a display screen of the web contents, wherein a program package, which is written in a function expansion program language for expanding the functions available to the client, is embedded in the web contents stored in the web server, the program package permitting the client to perform a process for employing the operating event detection function of a client to detect an operating event, a process for analyzing a string of operating events that are detected to extract a predetermined, specific operation, and a process for extracting from the web contents target information for the specific operation, and for returning the target information to the web server. This arrangement is superior because when an information processing apparatus accesses the web contents in which a web contents creator has embedded a program package, the information processing apparatus can obtain information concerning the contents that a user is interested in. The obtained information can then be employed for services, such as research performed to ascertain web audience rates and a reduction in the search conditions for a search engine.

Furthermore, according to the present invention, an information extraction system comprises: a web server, for storing web contents; and a client, for receiving the web contents from the web server, via a communication network, and for displaying the web contents, wherein the client includes an operating event detection function for detecting, as a manipulation event, an operation performed by a user on a display screen of the web contents, wherein the web server embeds, in the web contents, a program package, which is written in a function expansion program language, that expands the functions available to the client and that permits the client to perform a process for employing the operating event detection function belonging to the client to detect an operating event, a process for analyzing a string of operating events that are detected to extract a predetermined specific operation and a process for extracting target information for the specific operation from the web contents and for returning the target information to the web server, and wherein the web server transmits the program package to the client. This arrangement is superior because the web server can obtain information concerning which of the stored web contents the user is interested in. The obtained information can then be employed for services, such as research performed to ascertain web audience rates and a reduction in the search conditions for a search engine.

Further, according to the present invention, an information extraction system comprises: a web server, for storing web contents; a proxy server, for receiving web contents from the web server via a communication network and for performing an additional process; and a client, for displaying the web contents for which the proxy server has performed the additional process, wherein the client includes an operating event detection function for detecting, as a manipulation event, an operation performed by a user on a display screen of the web contents, wherein the proxy server embeds, in the web contents received from the web server, a program package, which is written in a function expansion program language, for expanding the functions available to the client, and that permits the client to perform a process for employing the operating event detection function belonging to the client to detect an operating event, a process for analyzing a string of operating events that are detected to extract a predetermined specific operation and a process for extracting target information for the specific operation from the web contents, and for returning the target information to the proxy server, and wherein the proxy server transmits the program package to the client. This arrangement is superior because the proxy server can obtain information concerning which of the stored web contents the user is interested in. The obtained information can then be employed for services, such as research performed to ascertain web audience rates and a reduction in the search conditions for a search engine.

Instead of transmitting the program package to the client, the proxy server may include: operating event acquisition means, for collecting operating events that are detected by the client; operating event analyzation means, for analyzing a string of the operating events that are received from the client and for extracting a predetermined specific operation; and information extraction means, for extracting, from the web contents, target information for the predetermined specific operation. This arrangement is preferable because, based on the operating event, a proxy server can extract information concerning specific operations, and information concerning data that users are interested in, so that the load imposed on clients can be reduced. The web contents from which a proxy server extracts information may be those that the proxy server receives, from a web server, and stores, or may be those that are requested from a client when the information is to be extracted.

Moreover, according to the present invention, an information extraction system comprises: a web site, for storing web contents; an information processing apparatus that includes a web browser, for receiving the web contents from the web server, via a communication network, and for displaying the web contents; and a portal site, for the information processing apparatus, wherein the portal site, upon being accessed by the information processing apparatus, transmits, to the information processing apparatus, a program file that serves as a local proxy for the information processing apparatus, wherein the web browser of the information processing apparatus includes an operating event detection function for detecting, as an operating event, an operation performed by a user on a screen on which the web contents are displayed, wherein the local proxy, which is operated by the information processing apparatus, embeds in the web contents received from the web server a program package, which is written in a function expansion program language, for expanding the functions available with the web browser, the program package permitting the web browser to perform a process for employing the operating event detection function belonging to a web browser to detect an operating event, a process for analyzing a string of operating events that are detected to extract a predetermined, specific operation, and a process for extracting target information for the specific operation from the web contents, and wherein the web browser transmits, to the portal site, information extracted by the web browser. This arrangement is superior because a portal site can obtain information concerning which of the web contents that an information processing apparatus received interested a user. The obtained information can then be used for services, such as research performed to ascertain web audience rates and a reduction in the search conditions for a search engine.

According to the present invention, an information processing apparatus comprises: browsing means, for displaying document data; operation detection means, for employing an input operation, performed by a user when the user browses the document data displayed by the browsing means, to detect an operation defined as a specific operation that the user unintentionally performed to obtain interesting information; and character string extraction means, for extracting a character string that is displayed at a location whereat the specific operation that is detected by the operation detection means is performed on a display screen of the browsing means. An operation that a user unintentionally performs to obtain interesting information differs from an active, intentional effort, such as when a user inputs information to complete a questionnaire. This operation constitutes an unintentional act that occurs while the user is reading a document carefully, such as when the user is reading text while tracing it with a mouse pointer, or such as when the user is reading text within a selected range. The above arrangement is preferable because, when this operation is detected and the target information for the operation is obtained, information can be obtained concerning those contents in which a user is interested without requesting the user to actively and intentionally input information.

The character string extraction means extracts a sentence unit or a line unit that includes the character string that is displayed at the location whereat the specific operation is performed. To extract the sentence or the line as a unit, the location of a return code or the delimiter for the sentence or the line is detected by extending the range of the character string that is to be extracted, and subsequently extracting the text within that range. This arrangement is preferable because the contents which interest the user can be extracted as information that conveys a specific meaning.

According to the present invention, an information collection apparatus that is connected to an information processing apparatus, which includes a web browser that receives web contents from a web server and displays the web contents, and which collects information concerning the information processing apparatus, comprises: storage means, for storing a program file for embedding, in the web contents received from the web server, a program package, which is written in a function expansion program language, that expands the functions of the web browser and that permits the web browser to perform a process for employing an operating event detection function performed by the information processing apparatus to detect an operating event, a process for analyzing a string of operating events that are detected to extract a predetermined specific operation, and a process for extracting target information for the specific operation from the web contents; transmission means, for reading the program file from the storage means and for transmitting the program file to the information processing apparatus; and information collection means, for collecting the information extracted by the information processing apparatus.

The program file stored in the storage means of the information collection apparatus is prepared by a Java applet, and the program package, which is written in Java script, is embedded in the web contents. This arrangement is preferable because information can be extracted by using a web browser that corresponds to the Java language that is widely employed by personal computers. Furthermore, this arrangement is superior because, since the program file is prepared by a Java applet, it need not be distributed in advance to the information processing apparatus.

Further, according to the present invention, a character string extraction method comprises the steps of: detecting a predetermined, specific operation based on an input operation performed by a user on a display screen on which document data are displayed; and extracting, as a unit, a sentence or a line that includes a character string that is displayed at a location whereat the specific operation that is detected has been performed on the display screen.

In addition, according to the present invention, a character string extraction method comprises the steps of: detecting, based on an input operation performed by a user on a display screen on which document data are displayed, a tracing and reading movement by which the pointer of a pointing device is moved along lines in a document that is displayed; and extracting, as a unit, a sentence or a line that includes a character string that is displayed at a location whereat the tracing and reading operation has been performed on the display screen. This arrangement is especially superior because, when tracing and reading are performed, the text at the location whereat the tracing and reading are performed can be extracted, without requiring any active, intentional input operation by a user. Further, this arrangement is preferable because a sentence or a line unit is employed to extract the character string, so that the contents in which a user is interested can be extracted as information that establishes a specific meaning.

At the step of extracting a character string, a sentence or a line that includes a character string belonging to a document immediately above a character string selected using the pointer is moved to another location on the display screen. For when a user reads a document while tracing it, he or she may read a line immediately above the line whereat the mouse pointer is located. This arrangement is superior because information that the user seems to be interested in reading can be thoroughly extracted.

Furthermore, according to the present invention, a character string extraction method comprises the steps of: employing an input operation performed by a user on a display screen on which document data are displayed to detect a line tracing and reading operation during which lines of a displayed document are pointed at in order, while the pointer of a pointing device is moved in a direction perpendicular to the lines; and extracting as a unit a sentence or a line that includes a character string that is displayed at a location whereat the line tracing and reading operation has been performed on the display screen. This arrangement is especially superior because when a user reads a long sentence while moving a mouse in the direction perpendicular to the lines of text, the text whereat the tracing and reading operation is performed can be extracted, without an active, intentional input operation being required of the user.

For horizontal text, a tracing and reading operation is detected in accordance with the movement of a pointer in the transverse direction that matches the direction of lines, and the line tracing and reading operation is detected in accordance with the vertical movement of the pointer perpendicular to the lines. On the other hand, for vertical text, the reading and tracing operation is detected by the vertical movement of the pointer that matches the direction of lines, and the line tracing and reading operation is detected from the transverse movement of the pointer perpendicular to the lines.

According to the present invention, provided is a storage medium on which the input means of a computer stores a computer-readable program that permits the computer to perform: a process for displaying the contents of document data; an process for detecting a predetermined specific operation based on a user's operation on a display screen where the document data are displayed; and a process for extracting a character string that is displayed at a location whereat the specific operation that is detected is performed on the display screen. This arrangement is superior because when an information processing apparatus loads a program and displays document data, information can be obtained concerning the contents of the document in which a user shows an interest. When the obtained information is transmitted to a server, it can be used for services, such as research performed to ascertain web audience rates and a reduction in the search conditions for a search engine.

Preferred Embodiment

The preferred embodiment of the present invention will be described in detail while referring to the accompanying drawings. First, an overview of the present invention will be given.

According to the present invention, it is assumed that a relationship is established between the unintentional movement of a mouse and what a user is interested in when the user is browsing a document displayed on a computer screen, and the characteristic movement of the mouse is detected in order to extract information that it is assumed is interesting to the user. Since the information concerning the interest of the user is extracted based on the movement of the mouse, a target in which the user shows an interest can be specified by using a small unit, such as a word or a sentence in a document, or an inserted table.

In this example embodiment, the following five mouse movements are defined as operations that the user unintentionally performs for a target that he or she is interested in.

1. Moving the mouse pointer while the button of the mouse is depressed (dragging).
2. Pointing with the mouse pointer at a link that overlaps a second link.
3. Clicking on the link using the mouse.
4. Moving the mouse pointer in the transverse direction when the text is being read as the mouse pointer is moved along the lines of the text (hereinafter referred to as tracing and reading).
5. Using the mouse pointer to designate the line in text that is currently being read, and gradually moving the mouse pointer vertically as each line is read (hereinafter referred to as vertical tracing and reading).

In this embodiment, the movements are defined for a mouse that is used as a pointing device. However, when another pointing device, such as a track ball or a pen tablet, is employed, it is assumed that substantially the same movements are performed for a target that the user is interested in. Therefore, in the following explanation, the pointing device type is not particularly designated, and the mouse is employed as an example.

The operations that a user intentionally performs for an interesting target are not limited to the five operations that have been explained. Other arbitrary operations that it is estimated that a user may perform for a target can be defined, and can be employed for information extraction.

FIG. 1 is a diagram for explaining the overall arrangement of an information extraction system according to this embodiment. An operating event detector 10 monitors the movement of a mouse on a document that is displayed on a computer screen, and detects an operating event. An operating event analyzer 20 analyzes a string of operating events (hereinafter referred to as an operating event string) that are detected by the operating event detector 10, and extracts a specific operation that it seems the user performed for an interesting target. A text extractor 30 extracts, from the document that is displayed on the computer screen, the text that is fetched by the operating event analyzer 20. These components are implemented as program modules that permit the computer to perform the above processes.

In this embodiment, the display screen of a web browser used to display web contents that generally are employed on the Internet is defined as an area wherein the movement of a mouse is monitored. That is, the operating event detector 10 detects an operating event in accordance with the movement of a mouse across the web contents (a home page) that are displayed by a web browser, the operating event analyzer 20 extracts a specific operation performed during the detected operating event, and the text extractor 30 extracts the target text as information that a user is interested in. In this case, the operating event detector 10, the operating event analyzer 20 and the text extractor 30 can be implemented by the performance of a dynamic HTML function.

The operating event detector 10 can be implemented by embedding it in an HTML file using a script language, such as JavaScript. In JavaScript, the movement of a mouse, clicking or dragging, the selection of a character string, the depression/release of a key, and the scrolling of a screen can be extracted as events. For example, when event handler "OnMouseMove" is defined for the movement of a mouse, and is written in an HTML file, the movement of the mouse can be detected as an operating event. Furthermore, also when the movement of a mouse is to be monitored on a display screen for a document, other than web contents, that is prepared by a predetermined application program, the API of an operating system can be employed to extract an operating event in accordance with a specific mouse movement.

The operating event analyzer 20 analyzes an operating event string that is detected by the operating event detector 10, and determines whether the operating event string is pertinent to a specific operation that has been defined in advance. When the operating event string is pertinent to the specific operation, the operating event analyzer 20 notifies the text extractor 30 that the operation has been performed. Further, the operating event analyzer 20 transmits information, such as the position whereat the operation was performed, to the text extractor 30 in order for it to be employed for the extraction of text. The specific operation that has been defined in advance is an operation that it is estimated a user will unintentionally perform for an interesting target. In this embodiment, the above described operations, i.e.,
1. selecting of text,
2. pointing to a link,
3. clicking on a link,
4. tracing and reading, and
5. vertical tracing and reading, are defined as specific operations. A detailed explanation will be given later for the processing used to extract these specific operations from an operating event string that is detected by the operating event detector 10.

When the text extractor 30 receives, from the operating event analyzer 20, a notification that a specific operation has been extracted, the text extractor 30 additionally receives, from the operating event analyzer 20, information such as the coordinate value required for extraction of the text. Thereafter, in accordance with the received information, the text analyzer 30 obtains the target text for the specific operation from the pertinent position of the web contents that are displayed by the web browser. A detailed explanation will be given later for the text extraction processing performed for each operation that is extracted by the operating event analyzer 20.

Then, the obtained text is transmitted to another system that employs the pertinent text. For example, a system that conducts research to ascertain web audience rates, or a search engine can receive the text obtained by the text extractor 30, and can employ the text as information related to the target that the user is interested in.

Figure 2:
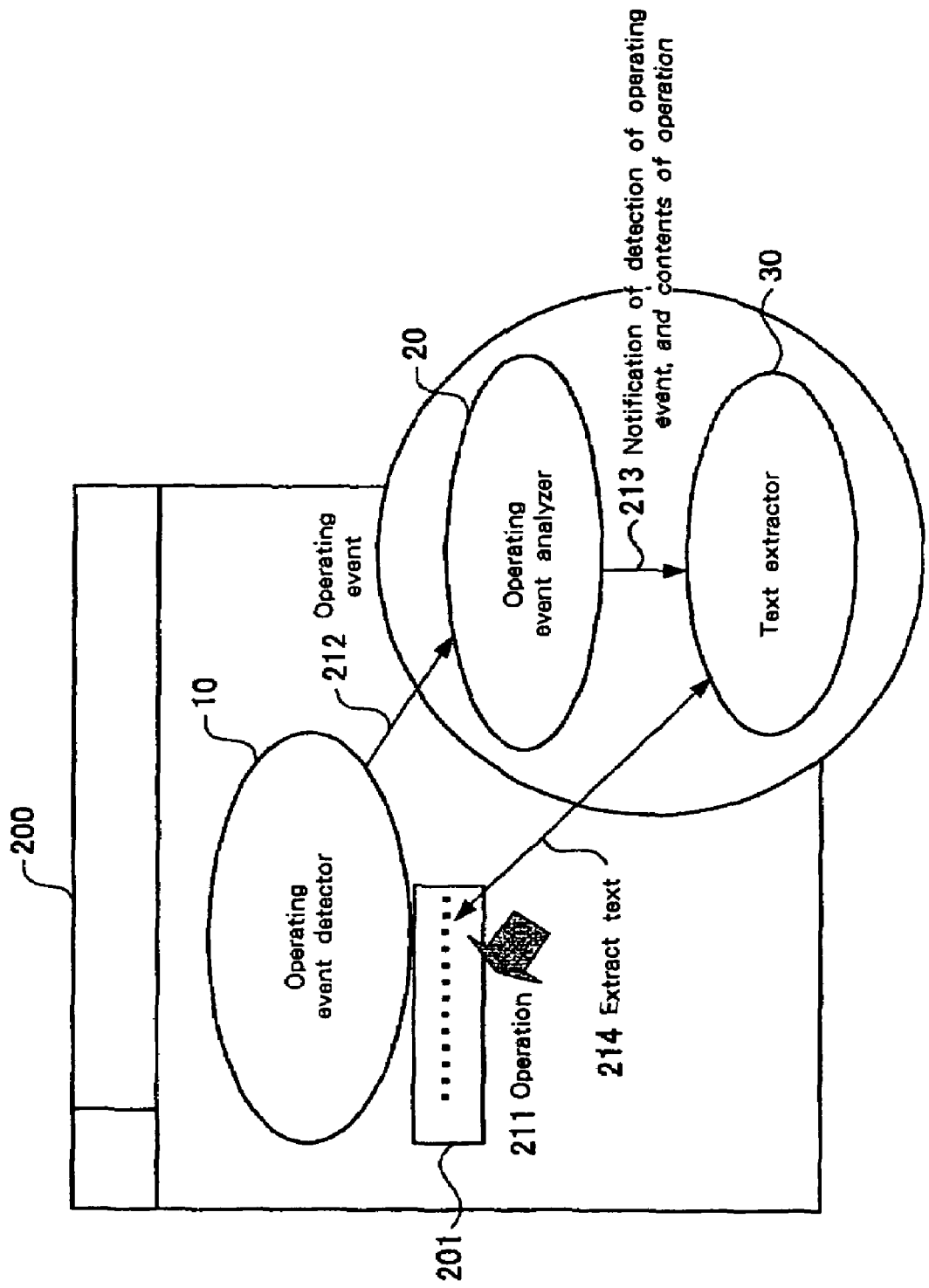
FIG. 2 is a conceptual diagram for explaining the functions of an operating event detector 10, an operating event analyzer 20 and a text extractor 30 according to the embodiment.

FIG. 2 is a conceptual diagram for explaining the processing perform by the operating event detector 10, the operating event analyzer 20 and the text extractor 30. In FIG. 2, the operating event detector 10, the operating event analyzer 20 and the text extractor 30 are written in JavaScript and are embedded in web contents 200.

While referring to FIG. 2, first, assume that a specific operation is performed by using a mouse for predetermined text 201 in the web contents 200 that are displayed by a web browser (211). Then, the operating event detector 10 detects an operating event based on the movement of the mouse, and transmits the operating event to the operating event analyzer 20 (212). Next, the operating event analyzer 20 analyzes the operating event string and extracts a specific operation. Following this, a notification that the specific operation has been extracted and information concerning the contents of the operation are transmitted to the text extractor 30 (213). Thereafter, the text extractor 30 performs a process in accordance with the specific operation, and extracts the text 201 from the web contents 200 (214).

Since it is assumed that the thus obtained text 201 is information that the user was interested in when he or she browsed the web contents 200, this information can be used for various services, such as research performed to ascertain a web audience rate and a reduction in the search conditions for a search engine. The extracted text 201 must then be transmitted to an operator who desires to use the text 201 as information concerning the user, and for this various methods may be employed: the text 201 may be embedded in a script form in the web contents 200 and transmitted by using a function of the web browser, or a predetermined program may be provided for an information processing apparatus and its function may be employed to transmit the text.

The text acquisition processing for the embodiment will now be described in detail for each of the specific operations. First, an explanation will be given for how the selection of text is performed for a specific operation.

From an operating event string that is transmitted by the operating event detector 10, the operating event analyzer 20 detects a "select" event that is generated when a user selects text. Based on the "select" event, the operating event detector 10 obtains a "selection" object that corresponds to the text selection operation. When the text selection operation is terminated, this can be identified by a "mouseup" event that is generated when a mouse button is released by a user. For dynamic HTML, when text selection is performed an area that is selected can be obtained as a "selection" object. Therefore, in a web browser that corresponds to the dynamic HTML, the "selection" object can be obtained immediately at the time the text is selected by a user.

The text extractor 30 extracts selected text by using the "selection" object that is generated by the operating event analyzer 20. Thus, as is shown in FIG. 4, the character string "cat is very" is extracted from the sentence "This cat is very smart." The extracted character string "cat is very" is transmitted to a predetermined system, and is used as information that the user is interested in.

Figure 4:
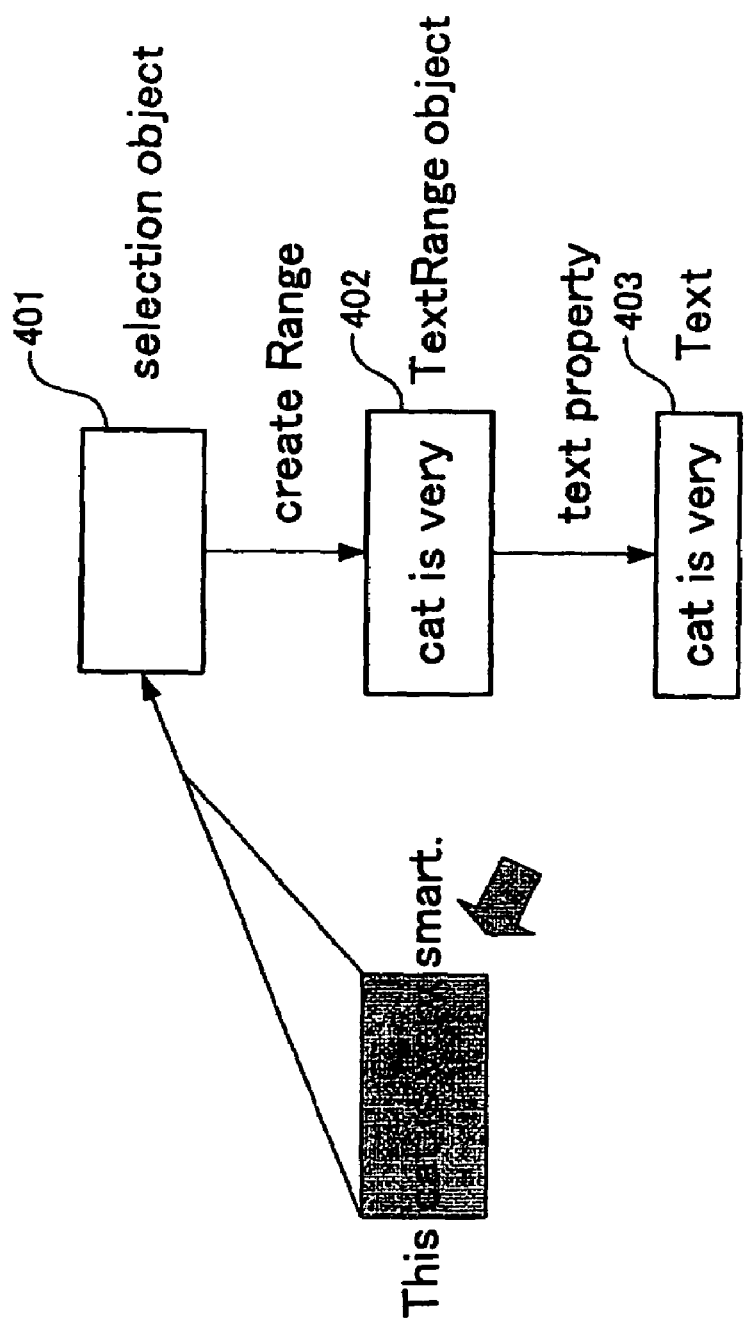
FIG. 4 is a diagram for explaining the text extraction process when text selection is performed.

FIG. 4 is a diagram for explaining the program required when the text extraction process of the text extractor 30 is carried out using dynamic HTML. The diagram is used for explaining the text extraction process when the text string "cat is very" in the sentence "This cat is very smart" is selected. In this example, a "getSelectedText" function is defined as the function used for the extraction of text. The argument for the "getSelectedText" function is the selection object "sl," which is generated by a user's selection of text (a "selection" object 401 in FIG. 4). On the third line of the program list in FIG. 3, the TextRange object "tr" ("TextRange" object 402 in FIG. 4) is generated by the "createRange" method based on the obtained selection object "sl". The "TextRange" object is an object for a text operation using dynamic HTML. On the fourth line of the program list, the selected text "cat is very" (text 403 in FIG. 4) is extracted by using the "text" property of the TextRange object.

An explanation will now be given for an example wherein pointing to a link is performed as a specific operation.

Of the events in an operating event string received from the operating event detector 10, the operating event analyzer 20 employs an event that occurs when a mouse pointer is placed on a link, and an event that occurs when the mouse pointer is removed from the link, so that a link pointing operation is detected. In this embodiment, at the same time as these events occur, text for which a link tag is provided and text that includes a portion into which a link is extended are extracted as a unit consisting of a sentence or a line. Further, in order to exclude a case wherein a mouse pointer simply passes through a link and a case wherein a mouse pointer accidentally remains on the link for an extended period of time, the pointing duration is measured and is used as a determination condition.

Specifically, first, when an event occurs indicating that a mouse pointer has been placed on a link (a "mouseover" event), a time t1 for the occurrence is stored. Then, when an event occurs indicating that the mouse pointer has been moved (a "mousemove" event), the position (coordinate value) of the mouse pointer on the link is obtained. Following this, when an event occurs indicating that the mouse pointer has been removed from the link (a "mouseout" event), a time t2 for the occurrence is obtained. If $T_1 < (t2-t1) < T_h$ is established for the threshold values $T_1$ and $T_h$, it is assumed that a link pointing operation using the mouse has been performed. The text extractor 30 is notified to this effect, and the position information for the mouse pointer that is obtained by the "mousemove" event is transmitted to the text extractor 30.

The threshold values $T_1$ and $T_h$ are provided in order to exclude a case wherein a mouse pointer simply passes a link and a case wherein the mouse pointer accidentally remains on the link for an extended period of time. That is, when $T_1 \geq (t2-t1)$ is established, it is assumed that the mouse pointer merely passed the link, and no notification is transmitted to the text extractor 30. And when $(t2-t1) \geq T_h$ is established, it is assumed that the mouse pointer accidentally remained on the link, and again, no notification is transmitted to the text extractor 30.

When the text extractor 30 receives a notification that a link pointing operation has been performed, and when the place whereat the pointing operation took place is a link tag, the text extractor 30 extracts text for which the link tag is provided as a sentence or a line unit. If at the site whereat the pointing operation has been performed is a link that is extended to a predetermined location, the text extractor 30 extracts as a sentence or a line unit the text that includes that link.

A method for extracting text as a sentence or a line unit will now be described. To delimit text by separating it into sentences or lines, first, the range of the text to be extracted is gradually expanded from the position (coordinate value) whereat the target link tag for the pointing operation is provided or whereat the pointing operation has been performed. When the return code or a symbol, such as a period or a comma, that represents a delimiter for a line or a sentence appears, the expansion of the range of the text is halted, and the obtained text string is extracted.

Figure 6:
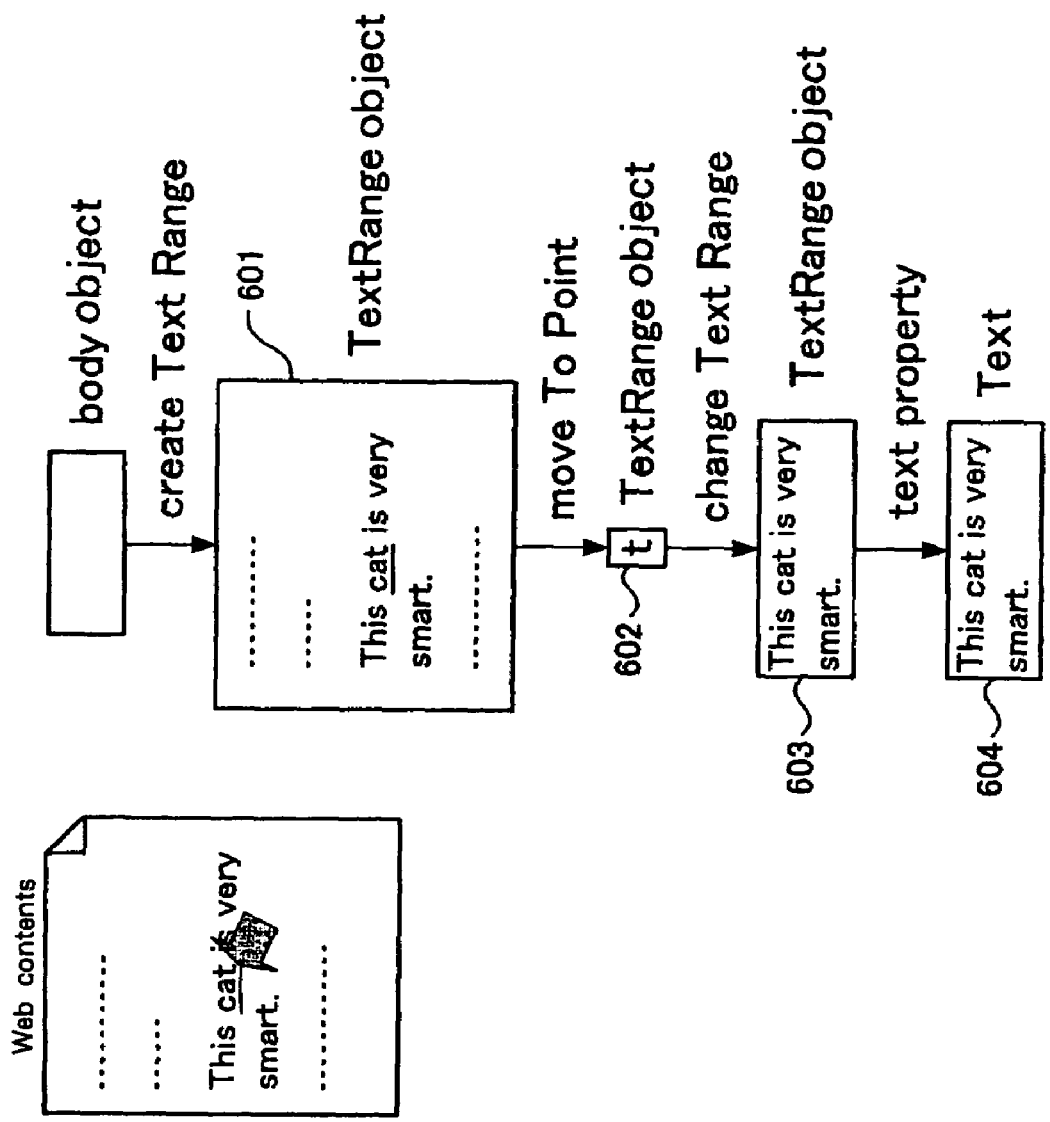
FIG. 6 is a diagram for explaining the text extraction process when the pointing to the link is performed.

FIG. 5 is a diagram for explaining the program required when the text extraction process of the text extractor 30 is implemented by using dynamic HTML. FIG. 6 is a diagram for explaining the text extraction process that is performed when the pointing operation is performed for a link (the underlined "cat"), in the sentence "This cat is very smart," contained in the web contents document that is displayed by the web browser. In this example, the "getLinkTagText" function and the "getLinkText" function are defined as the functions used for extracting text.

The "getLinkTagText" function is a function for extracting text for which a link tag is provided, and the argument is an anchor object, an "anchor." On the third line of the program list in FIG. 5, all the text for which the pertinent link tag is provided is extracted. The "getLinkText" function is a function for extracting as a sentence or a line unit text that includes a portion into which a link is extended, and the arguments are the coordinates where the mouse pointer is located. The text extraction processing performed by the "getLinkText" function will now be described while referring to FIG. 6.

On the eighth line of the program list in FIG. 5, the "createTextRange" method is employed for the "body" object, and the "TextRange" object that includes the entire page of the web page is generated ("TextRange" object 601 in FIG. 6). Then, on the ninth line of the program list, the "moveToPoint" method is employed to designate, as a "TextRange" object, a character that is pointed at the mouse pointer ("TextRange" object 602 in FIG. 6). Next, on the tenth line of the program list, the function for changing the selected area of the text (the "changeTextRange" function in FIG. 6 is designated for the performance of this process) is employed to expand the selected range for the "TextRange" object to include a sentence unit or a line unit ("TextRange" object 603 in FIG. 6). Finally, on the eleventh line of the program list, the "Text" property of the TextRange object is employed to extract "This cat is very smart." (text 604 in FIG. 6).

An explanation will now be given for a case wherein clicking on a link is the specific operation that is performed. Of the events in the operating event string received from the operating event detector 10, the operating event analyzer 20 employs an event that occurs when a link is clicked on to detect the link clicking operation. As well as for the link pointing operation, in this embodiment, at the same time an event occurs, the text for which a link tag is provided and the text that includes a portion into which a link is extended are extracted as a sentence unit or a line unit. Specifically, when an event occurs indicating that a mouse pointer has been placed on a link (a "mouseover" event), the occurrence time t1 is stored. Then, when a mouse moving event (a "mousemove" event) occurs, the position (a coordinate value) of the mouse pointer on the link is obtained. Following this, when a click event (a "click" event) occurs, the text extractor 30 is notified of this event occurrence, and position information for the mouse pointer, which was obtained at the time of the "mousemove" event, is transmitted to the text extractor 30.

When the text extractor 30 receives notification of the link clicking operation, and when the place whereat the link click operation occurred is a link tag, the text extractor 30 extracts as a sentence or a line unit the text associated with the link tag. And if the place whereat the link clicking operation occurs is a link that is extended into a predetermined portion of a sentence, the text including the link is extracted as a sentence or a line unit. Since the text extraction process is performed by the text extractor 30 in the same manner as the pointing operation, no further explanation for it will be given.

An explanation will now be given for the tracing and reading operation. The tracing and reading operation is extracted by using the position (the coordinates) of a mouse pointer that is obtained by using a mouse movement event and an event occurrence time. The movement of a mouse during the tracing and reading operation is linear and horizontal, and various methods can be used for detecting this movement. However, for this embodiment the following method is employed.

First, the sequential horizontal movement of the mouse is detected. When the distance that the mouse travels sequentially and horizontally is equal to or greater than a predetermined threshold value, this movement is detected as a tracing and reading operation. This is because an accidental linear, horizontal movement of the mouse is excluded. Since it is expected that a mouse would not travel far during such an accidental movement, an appropriate threshold value is set to exclude it. Then, each time a mouse moving event occurs, the sequential horizontal movement of the mouse can be detected and used to determine the following conditions.

First, the inclination of the movement of the mouse, which is obtained from several (two to four) of the latest coordinates for the mouse pointer, is employed to determine whether the mouse is being moved horizontally across on a display screen. Second, a difference in the occurrence times between a current event and an immediately preceding event is employed to determine whether the movement of the mouse has been discontinued.

When the above conditions are established and when it is ascertained that the mouse is moving horizontally and that its movement has not been discontinued, it is assumed that the mouse is traveling sequentially and horizontally. And when one of the two conditions is not established, it is assumed that the sequential horizontal movement has been terminated.

Based on the above premise, an explanation will now be given for the process performed by the operation event analyzer 20 to detect the tracing and reading operation. In the following explanation, a parameter Ar is a threshold value related to the inclination used to determine whether the direction in which a mouse travels is to be regarded as the horizontal direction. A parameter Tr is a threshold value related to a stop time used to determine whether the sequential movement of the mouse is continuing. And a parameter L is a threshold value related to the distance of the travel used to determine whether the sequential horizontal movement that has been detected is a tracing and reading operation. While the coordinates that are used are represented by orthogonal x-y coordinates, X being defined as the horizontal direction across the display screen (the direction parallel to lines), and Y direction being defined as the vertical direction on the display screen (the direction perpendicular to lines).

Each time the "mousemove" event occurs, the operation event analyzer 20 obtains the difference $(x_i-x_{i-n}, y_i-y_{i-n})$ between the coordinate $(x_i, y_i)$ of the mouse pointer and the coordinate $(x_{i-n}, y_{i-n})$ of the mouse pointer when the "mousemove" event occurred n times before. When the difference in the x direction (horizontal) is a positive value, the inclination a is calculated using the following equation $a=(y_i-y_{i-n})/(x_i-x_{i-n})$. The time interval $t_d$ between the time $t_i$ of the last event occurrence and the time $t_{i-1}$ of the preceding event occurrence is calculated using the following equation $$t_d = t_i - t_{i-1}.$$

One of the following four processing types is performed in accordance with the obtained values for a and $t_d$.

(1) A case wherein the flag $r_{flag}$ that represents the sequential horizontal movement is OFF and a<Ar and $t_d$<Tr have been established (the inclination and the time interval from the preceding event fall within the range of the threshold value), and it is assumed that the horizontal and sequential movement of the mouse has begun, the flag $r_{flag}$ has been set to ON and the coordinates $(x_i, y_i)$ of the mouse pointer have been stored.

(2) A case wherein the flag $r_{flag}$ is OFF and a≧Ar or $t_d$≧Tr has been established (at the least, either the inclination or the time interval from the preceding event exceeds the range of the threshold value), and it is assumed that the mouse is not traveling horizontally and sequentially.

(3) A case wherein the flag $r_{flag}$ is ON and a<Ar and $t_d$<Tr have been established, and it is assumed that the mouse is moving horizontally and sequentially and that the coordinates $(x_i, y_i)$ of the mouse pointer have been stored.

(4) A case wherein the flag $r_{flag}$ is ON and a≧Ar or $t_d$≧Tr has been established, and it is assumed that the horizontal and sequential movement of the mouse has ended and the flag $r_{flag}$ is set to OFF. The stored coordinates of the mouse pointer that are obtained while the mouse was moving horizontally and sequentially are employed to calculate the x coordinates at the start point and the end point of the movement, the average of the y coordinates obtained during the movement, and the distance l of the movement. If l>L, the distance of the extracted movement is greater than the threshold value L, and this movement is not determined to be a tracing and reading operation. But if l≦L, the movement is determined to be a tracing and reading operation.

When a tracing and reading operation is detected in the above described manner, the operation event analyzer 20 notifies the text extractor 30 that the tracing and reading operation has been performed, and also transmits to the text extractor 30 the coordinates (position information) of the mouse pointer at the tracing and reading start point and end point that were obtained for the "mousemove" event.

Upon receipt of the notification that the reading and tracing operation has been performed, the text extractor 30 extracts text at the place whereat the tracing and reading operation was performed. In this case, the text on a line that the mouse pointer overlapped during the reading and tracing operation, and the text on the line immediately above are extracted as sentence or line units. This is because during a tracing and reading operation a user tends to read a line that the mouse pointer overlaps or the line immediately above. Therefore, since the text on the line that the mouse pointer overlaps and on the line immediately above is extracted, the information that the user seems to be interested in seldom is not the extraction target. The text may also be extracted from either the line the mouse pointer overlaps or the line immediately above, instead of being extracted from the two lines. To identify the line immediately above the line overlapped by the mouse pointer, the lines are sequentially examined upward in the y coordinate direction by employing the position of the mouse pointer as a reference, and when a character string that is detected has been changed, it is assumed that the line has been shifted to the line immediately above. Specifically, at first, three characters, i.e., a character whereat the mouse pointer is located, a character m characters before and a character n characters after, m and n being numerals equal to or greater than two, are stored. Then, the coordinates are moved several dots from the position of the mouse pointer in the y coordinate direction, and a character at the sequentially obtained coordinates, a character positioned m characters before and a character positioned n characters after are obtained. These obtained characters are compared with the character at the position whereat the mouse pointer is located, and the characters before and after that character, all of which are stored in advance. When the three characters all match, it is assumed that the line is still that one overlapped by the mouse pointer, and for the other case, it is assumed that the current line is the one immediately above.

An explanation will now be given for the reason that a total of three characters, the character whereat the mouse pointer is located and the two characters that precede and succeed it by several characters, are employed in order to identify the line the mouse pointer overlapped and the line immediately above. When only one character is employed to identify these two lines, the character pointed at by mouse pointer may by accident match the character positioned above. Thus, to increase the reliability, a plurality of characters are employed to identify the lines. Characters that are separated by a distance of several characters from the character at which the mouse pointer is pointed are employed because when the same word is positioned above a word that includes a character that the mouse pointer overlaps, several characters between the upper and lower lines, including the character at the position of the mouse pointer, may be identical, and thus the possibility that this phenomenon may occur must be eliminated. Further, characters that are located above and below the character at the position of the mouse pointer are employed for the following reason. When the character at the position of the mouse pointer is the first or the last on a page, and when characters are extracted only forward or backward, the character positioned at a distance of several characters from the character pointed at by the mouse pointer may not be on the pertinent page; however, so long as characters used for comparison are extracted before and after the character at the position of the mouse pointer, the lines can be identified.

The processing for identifying the line immediately above the line the mouse pointer overlaps will now be described while referring to FIG. 7. In FIG. 7, the three characters ("j," "r" and "e") on the line the mouse pointer overlaps are stored. Later, the target coordinates (the selection range for the "TextRange" object that will be described later) are moved upward from the coordinates at the position of the mouse pointer in the y coordinate direction, and the three characters ("i," "r" and "0") on the line at the coordinates are obtained. The characters at the position of the mouse pointer are matched "r"s, but the characters in the two pairs "j" and "i" and "e" and "0" differ, so that the line can be assumed to be the one immediately above.

Based on the above premise, an explanation will now be given for the processing performed by the text extractor 30 to extract text from the target line to be used for the tracing and reading operation and the line immediately above. FIG. 8 is a diagram for explaining the program that is required when the text extraction process of the text extractor 30 is implemented by using dynamic HTML.

In this example, the "getTracedText" function is defined to extract the text when the tracing and reading operation is detected. The "getTracedText" function is a function whereby after the operation event analyzer 20 has detected the tracing and reading operation, the coordinates of the mouse pointer are employed to extract the text on the line the mouse pointer overlaps or on the line immediately above. The arguments x and y are the coordinates (x, y) whereat the mouse pointer is located. In addition, "up" denotes the line to be extracted, and when up=false, the line that the mouse pointer overlaps is extracted, while when up=true, the line immediately above the line the mouse pointer overlaps is extracted. On the third line of the program listing in FIG. 8, the "TextRange" object is generated, and on the fourth line, the selection range for the "TextRange" object is shifted to the character that is positioned at the coordinates (x, y) whereat the mouse pointer is located.

The process described on the fifth to twenty-fifth lines of the program list is one used to identify the line immediately above the line the mouse pointer overlaps. First, on the seventh to eleventh lines, the three characters (centerchar1, rightchar1 and leftchar1) on the line the mouse pointer overlaps are obtained. These characters are the character (centerchar1) at the position of the mouse pointer, the character (rightchar1) positioned after at a distance of CMOVE characters, and the character (leftchar1) positioned before at a distance of CMOVE characters.

On the twelfth to twenty-fourth lines, the coordinates are moved up from the position of the mouse pointer in the y coordinate direction PMOVE points. Then, the three characters (centerchar2, rightchar2 and leftchar2), i.e., the character at the current position and the two characters positioned CMOVE characters to the front and the rear, are obtained. These obtained characters are compared with the characters (centerchar1, rightchar1 and leftchar1) obtained from the seventh to the eleventh lines, and if even one character is different, the line is identified as the line immediately above.

Thereafter, on the twenty-sixth line, the selection range of the "TextRange" object is expanded until it is equal to a sentence or a line unit, and on the twenty-seventh line, the text on the pertinent line is extracted. The same method is employed as that which was explained for use for the link pointing operation, where text is extracted as a sentence or a line unit from the line the mouse pointer overlaps or from the line immediately above.

An explanation will now be given for a case where the vertical tracing and reading operation is the specific one that is performed.

For the vertical tracing and reading operation, a mouse pointer is pointed at lines of text that are being read as it is gradually moved down, little by little, in the direction perpendicular to the lines. Thus, each movement of a mouse during this operation is performed very slowly, and spans only a short distance. The vertical tracing and reading operation is extracted by using the coordinates (x, y) of the mouse pointer that are obtained by the mouse moving event, and the occurrence time for the event. Various methods have been proposed for the detection of the vertical tracing and reading operation, but the following method is employed for this embodiment.

First, the sequential vertical travel of the mouse is detected. When the distance of the sequential vertical travel is equal to or greater than a threshold value, it is assumed that this movement is being used for the vertical tracing and reading operation. This is because the possibility that the vertical and linear travel of the mouse is accidental can be eliminated. The sequential vertical movement of the mouse can be detected by determining whether the following conditions are established each time the mousemove event occurs.

First, the displacement distance between the coordinates of the mouse pointer for the last event and the coordinates of the mouse pointer for the preceding event is employed to determine whether the mouse is moving vertically in a window. Since each movement of the mouse during the vertical tracing and reading operation is performed very slowly and spans only a short distance, instead of using inclination, the displacement distance for the coordinates of the mouse pointer is employed to determine whether the operation is being performed. Second, a difference in the occurrence time between the last event and the preceding event is employed to determine whether the movement of the mouse has been discontinued.

When these conditions are established, and when it is ascertained that the mouse is being moved vertically and that its movement has not been discontinued, it is assumed that the mouse is traveling vertically and sequentially. But when one of the two conditions can not be established, it is assumed that the vertical and sequential movement has been terminated.

Based on the above described premise, an explanation is given for the processing performed by the operation event analyzer 20 to detect the vertical tracing and reading operation. In the following explanation, parameters Xr and Yr are threshold values and are used for displacement distances during the travel of the mouse in order to determine whether the direction in which the mouse is moving should be regarded as the vertical one. Parameter Tr is a threshold value for the stop time that is used to determine whether the movement of the mouse is continuous. And parameter L is a threshold value for the distance travelled that is used to determine whether the sequential and vertical movement that is detected is for the vertical tracing and reading operation. The coordinates are represented by the orthogonal x-y coordinates, with the x direction being defined as the horizontal direction on the display screen (i.e., the direction parallel to the lines) and the y direction being defined as the vertical direction on the display screen (i.e., the direction perpendicular to the lines).

Each time a "mousemove" event occurs, the operation event analyzer 20 calculates a difference $(x_i-x_{i-1}, y_i-y_{i-1})$ between the coordinates $(x_i, y_i)$ of the mouse pointer and the coordinates $(x_{i-1}, y_{i-1})$ of the mouse pointer for the preceding "mousemove" event. When $0<y_i-y_{i-1}<Yr$ is established, an absolute value d of the difference in the x direction is calculated using the following equation $$d=|x_i-x_{i-1}|.$$

Further, a time interval $t_d$ between the occurrence time $t_i$ for the last event and the occurrence time $t_{i-1}$ for the preceding event is calculated using the following equation $$t_d=t_i-t_{i-1}.$$

In accordance with the values obtained for d and $t_d$, one of the following four process types is performed.

(1) A case wherein the flag $r_{flag}$ that represents the sequential vertical movement is OFF and d<Xr and $t_d$<Tr are established (the displacement in the x direction and the time interval from the preceding event fall within the range of the threshold value), and it is assumed that the vertical and sequential movement of the mouse has begun, that the flag $r_{flag}$ has been set to ON and the coordinates $(x_i, y_i)$ of the mouse pointer have been stored.

(2) A case wherein the flag $r_{flag}$ is OFF and d≧Xr or $t_d$≧Tr is established (at the least, either the displacement in the x direction or the time interval from the preceding event exceeds the range of the threshold value), and it is assumed that the mouse is not travelling vertically and sequentially.

(3) A case wherein the flag $r_{flag}$ is ON and d<Xr and $t_d$<Tr are established, and it is assumed that the mouse is moving vertically and sequentially and the coordinates $(x_i, y_i)$ of the mouse pointer have been stored.

(4) A case wherein the flag $r_{flag}$ is ON and d≧Xr or $t_d$≧Tr is established, and it is assumed that the vertical and sequential movement of the mouse is terminated and the flag $r_{flag}$ has been set to OFF. The coordinates of the mouse pointer that are stored, which are obtained while the mouse is moving vertically and sequentially, are employed to calculate the y coordinates at the start point and the end point of the movement, the average for the x coordinates obtained during the movement, and the distance l of the movement. If l>L, the distance of the extracted movement is greater than the threshold value L, and this movement is not determined to be a vertical tracing and reading operation. But if l≦L, the movement is determined to be a vertical tracing and reading operation.

When a vertical tracing and reading operation is detected in the above described manner, the operation event analyzer 20 notifies the text extractor 30 that of the tracing and reading operation is being performed, and also transmits to the text extractor 30 the coordinates (position information) of the mouse pointer at the tracing and reading start point and end point that were obtained for the mousemove event.

Upon receipt of the notification that a vertical reading and tracing operation has been performed, the text extractor 30 extracts text at the place whereat the vertical tracing and reading operation has been performed. In this case, the text on a line the mouse pointer overlapped during the reading and tracing operation, and the text on the line immediately above are extracted as sentence or line units. The text may be extracted from either the line which was overlapped by the mouse pointer or the line immediately above.

Since the text extraction processing by the text extractor 30 is performed in the same manner as for the tracing and reading operation described above, no further explanation for it will be given.

In the above description, the operation for moving the mouse pointer horizontally along the lines of the text is called tracing and reading, and the operation for using the mouse pointer to point at the current line in the text and for slowly shifting the mouse pointer down, little by little, in the direction perpendicular to the lines is called vertical tracing and reading. This is because it is assumed that the text is written horizontally. When the text is written vertically, however, vertical reading performed along the lines corresponds to the tracing and reading operation, and horizontal reading performed perpendicular to the lines corresponds to the vertical reading and tracing operation.

The information extraction system in this embodiment is connected to a network, such as the Internet, and functions as an information processing apparatus on which a web browser is mounted. That is, the web contents that the information processing apparatus receives from a web server are displayed by the web browser, and each of the above described operations that a user unintentionally performs, when he or she is browsing through data provided by the displayed web contents, is determined to be an operating event and the target text for the detected operation is extracted.

The various modes that follow can be employed as means for providing, for the information processing apparatus, the function of the information extraction system for the embodiment. Typical modes will now be described while referring to FIGS. 9 to 12.

Figure 9:
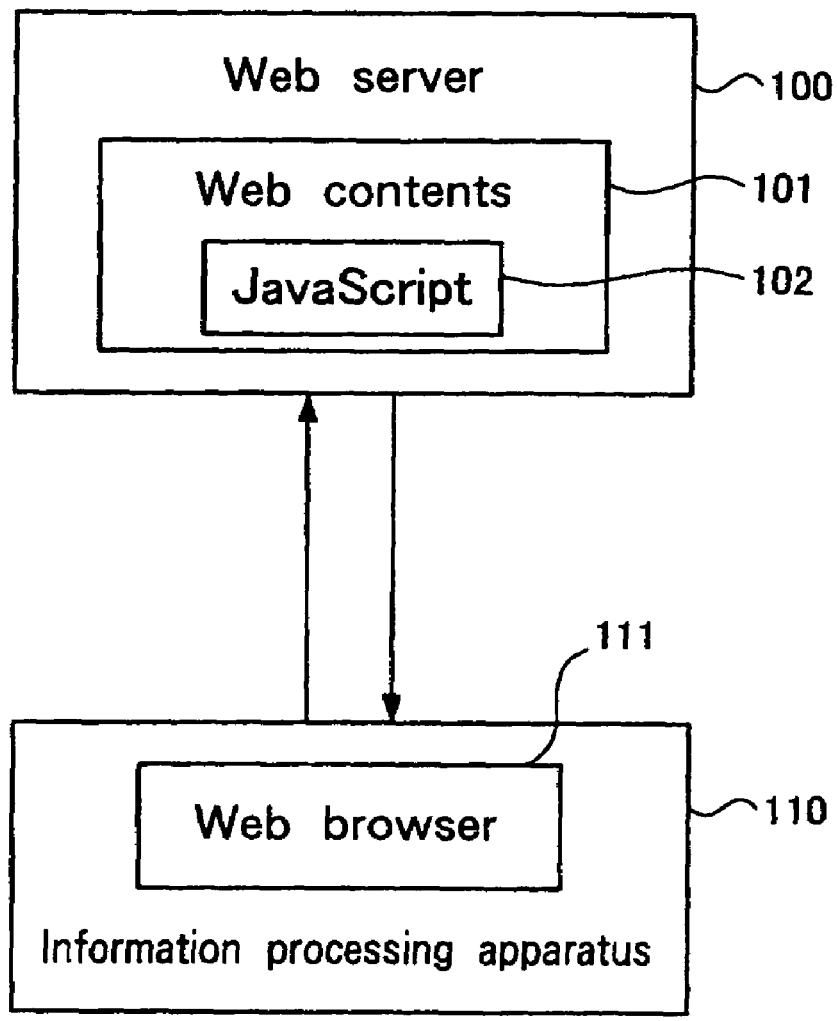
FIG. 9 is a diagram for explaining a mode for providing an information extraction system according to the present invention.

In the mode shown in FIG. 9, the operation event detector 10, the operation event analyzer 20 and the text extractor 30 are written in a script language, such as JavaScript, and are embedded in advance in web contents 101 that are stored in a web server 100. With this arrangement, when an information processing apparatus 110 receives the web contents 101 from the web server 100, based on script 102 that is embedded in the web contents 101, a web browser 111 performs a process for detecting an operating event, a process for analyzing the operating event string and for detecting the above described specific operation, such as the selection of a character string, the pointing to a link or the tracing and reading, and a process for extracting, for the pertinent operation, a target character string that is thereafter transmitted to the web server 100. The function for returning the extracted text to the web server 100 may be provided by embedding it, as well as the operating event detector 10, the operating event analyzer 20 and the text extractor 30, as a script in the web contents 101, or together with the web contents 101, it may be distributed as a Java applet to the information processing apparatus 110.

Since the thus obtained text can be regarded as information that the user has shown an interest in while browsing the web contents 101, the web server 100 can employ the text to provide various services, such as research performed to ascertain web audience rates and a reduction in the search conditions for a search engine.

Figure 10:
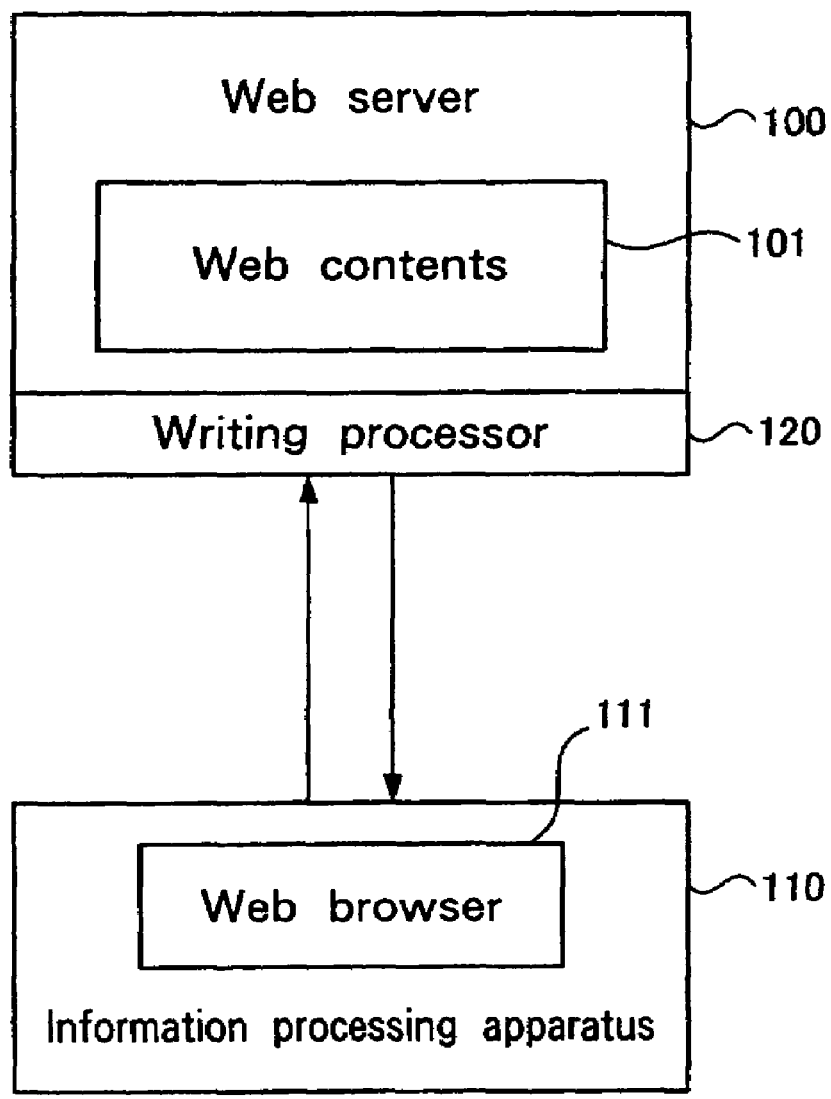
FIG. 10 is a diagram for explaining another mode for providing an information extraction system according to the present invention.

In the mode shown in FIG. 10, the web server 100 includes a writing processor 120 for writing the operating event detector 10, the operating event analyzer 20 and the text extractor 30 in the web contents 101 using a script language, such as JavaScript. In this mode, when a request to access the web contents 101 is issued by the information processing apparatus 110, the writing processor 120 of the web server 100 writes in the web contents 101 the script for carrying out the functions of the operating event detector 10, the operating event analyzer 20 and the text extractor 30. Then, the resultant web contents 101 are transmitted to the information processing apparatus 110.

Based on the script that is embedded in the received web contents 101, the web browser 111 of the information processing apparatus 110 performs the process for detecting an operating event, the process for analyzing the operating event string and for detecting a specific operation, such as the selection of a character string, the pointing to a link or the tracing and reading, and the process for extracting, for the pertinent operation, a target character string that is thereafter transmitted to the web server 100. The function for transmitting the extracted text to the web server 100 may be provided by embedding it, as well as the operating event detector 10, the operating event analyzer 20 and the text extractor 30, in the web contents 101 as a script, or together with the web contents 101, it may be distributed in the form of a Java applet to the information processing apparatus 110.

Since the thus obtained text can be regarded as information that the user has shown an interest in while browsing the web contents 101, the web server 100 can employ the text to provide various services, such as research performed to ascertain web audience rates and a reduction in the search conditions for a search engine.

Figure 11:
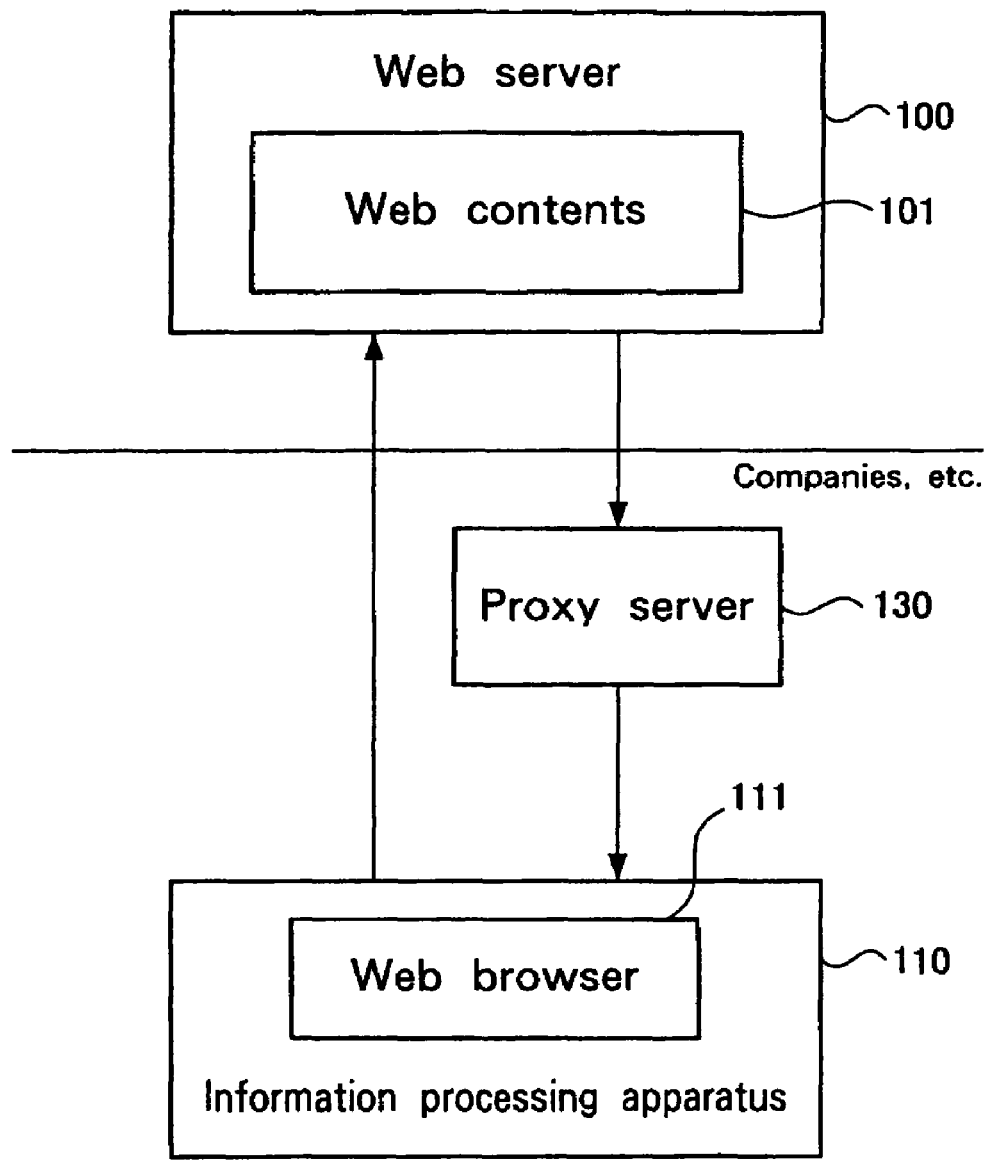
FIG. 11 is a diagram for explaining an additional mode for providing an information extraction system according to the present invention.

In the mode shown in FIG. 11, a proxy server 130 is located between the web server 100 and the information processing apparatus 110, and writes the operating event detector 10, the operating event analyzer 20 and the text extractor 30 in the web contents 101 using a script language, such as JavaScript. In this mode, when a request to access the web contents 101 is issued by the information processing apparatus 110, the proxy server 130 receives from the web server 100 the web contents 101 and writes in them the script for carrying out the functions of the operating event detector 10, the operating event analyzer 20 and the text extractor 30. It then transmits the resultant web contents 101 to the information processing apparatus 110.

Based on the script that is embedded in the received web contents 101, the web browser 111 of the information processing apparatus 110 performs the process for detecting an operating event, the process for analyzing the operating event string to detect a specific operation, such as the selection of a character string, the pointing to a link or the tracing and reading, and the process for extracting, for the pertinent operation, a target character string that is thereafter transmitted to the proxy server 130. The function for transmitting the extracted text to the proxy server 130 may be provided by embedding it, as well as the operating event detector 10, the operating event analyzer 20 and the text extractor 30, as a script in the web contents 101, or together with the web contents 101, it may be distributed in the form of a Java applet to the information processing apparatus 110.

Since the thus obtained text can be regarded as information that the user has shown an interest in while browsing the web contents 101, the proxy server 130 can employ the text to provide various services, such as research performed to ascertain web audience rates and a reduction in the search conditions for a search engine.

As a modification of the mode in FIG. 11, the proxy server 130 may not embed in the web contents 101 the script for carrying out the functions of the operating event analyzer 20 and the text extractor 30, and may permit the information processing apparatus 110 merely to detect an operating event. In this case, the operating event analyzer 20 and the text extractor 30 are provided for the proxy server 130, and the operating event detected by the information processing apparatus 110 is transmitted to the proxy server 130. Then, the proxy server 130 performs the process for analyzing the operating event string to detect a specific operation, such as the selection of a character string, the pointing to a link or the tracing and reading, and the process for extracting, for the pertinent operation, the target character string.

To transmit, to the proxy server 130, the operating event that is detected by the information processing apparatus 110, the script for transmitting the operating event may be embedded in the web contents 101 before the proxy server 130 transits them to the information processing apparatus 110, or a request for the transmission of an operating event may be issued by the proxy server 130 to the information processing apparatus 110 so that the information processing apparatus 110 transmits the operating event to the proxy server 130. Furthermore, the proxy server 130 may hold the web contents 101 received from the web server 100 and the text extractor 30 may extract the text from them, or the web contents 101 may be transmitted to the proxy server 130 by the information processing apparatus 110.

Figure 12:
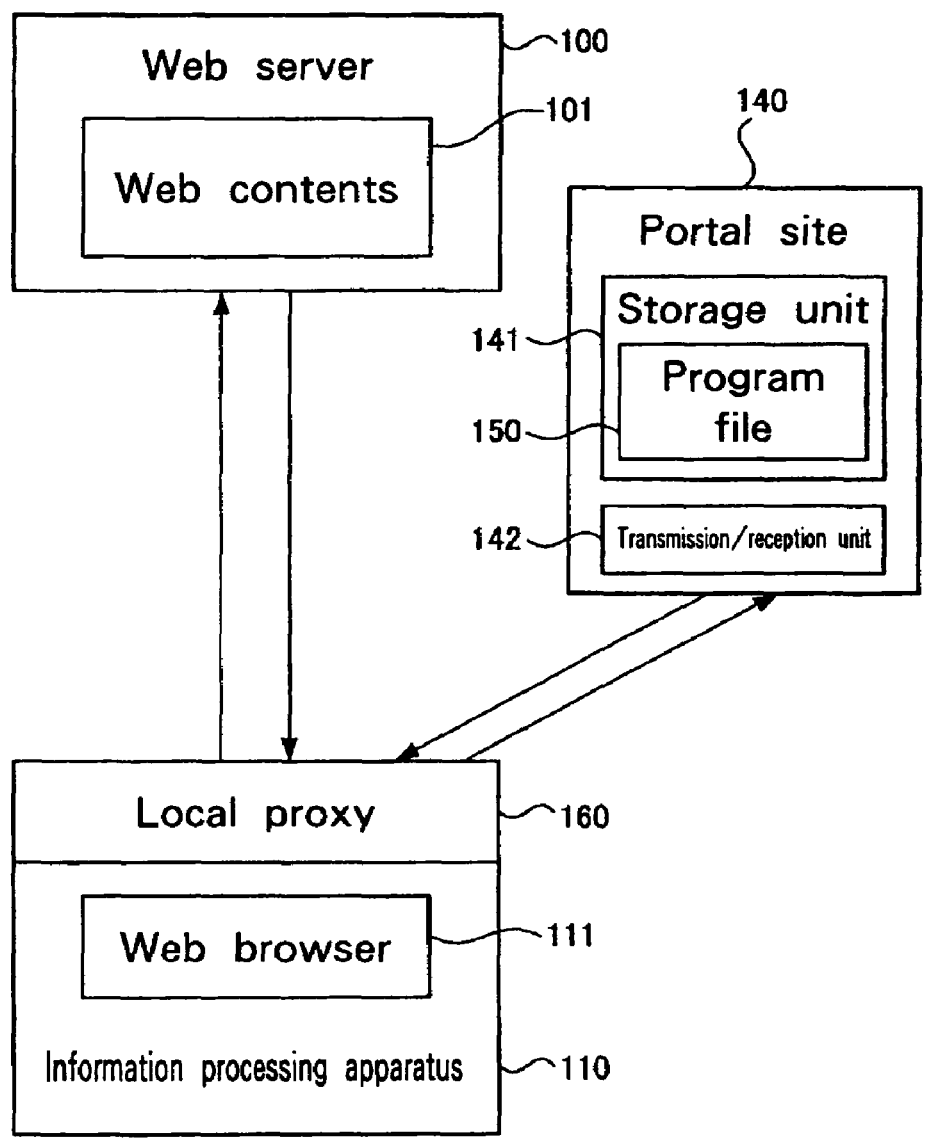
FIG. 12 is a diagram for explaining one further mode for providing an information extraction system according to the present invention.

In the mode shown in FIG. 12, a portal site 140, which the information processing apparatus 110 accesses first when it is connected to the Internet, transmits a program file 150 to the information processing apparatus 110. This program file 150 implements a local proxy that writes the operating event detector 10, the operating event analyzer 20 and the text extractor 30 in the web contents 101 using a script language, such as JavaScript. In this mode, when the information processing apparatus 110 accesses the portal site 140, the program file 150 that is stored in a storage unit 141 at the portal site 140 is transmitted via a transmission/reception unit 142 to the information processing apparatus 110. The program file 150 is prepared, for example, as a Java applet. The program file 150 that is transmitted by the portal site 140 to the information processing apparatus 110 serves as a local proxy 160 in the information processing apparatus 110. The local proxy 160 writes, in the web contents 101 received from the web server 100, a script for implementing the functions of the operating event detector 10, the operating event analyzer 20 and the text extractor 30, and transmits the resultant web contents 101 to the web browser 111.

Based on the script embedded in the web contents 101 that are received from the local proxy 160, the web browser 111 performs the process for detecting an operating event, the process for analyzing the operating event string to detect a specific operation, such as the selection of a character string, the pointing to a link or the tracing and reading, and the process for extracting, for the pertinent operation a target character string that thereafter is transmitted to the portal site 140. The function for transmitting the extracted text to the proxy server 130 may be provided by embedding it, as well as the operating event detector 10, the operating event analyzer 20 and the text extractor 30, as a script in the web contents 101, or it may be provided as a function of the local proxy 160. Or else, the transmission/reception unit 142 of the portal site 140 may issue a request, to the information processing apparatus 110, for the transmission of the extracted text, which it thereafter collects.

Since the thus obtained text can be regarded as information that the user has shown an interest in while browsing the web contents 101, the portal site 140 can employ the text to provide various services, such as research performed to ascertain web audience rates and a reduction in the search conditions for a search engine.

Figure 13:
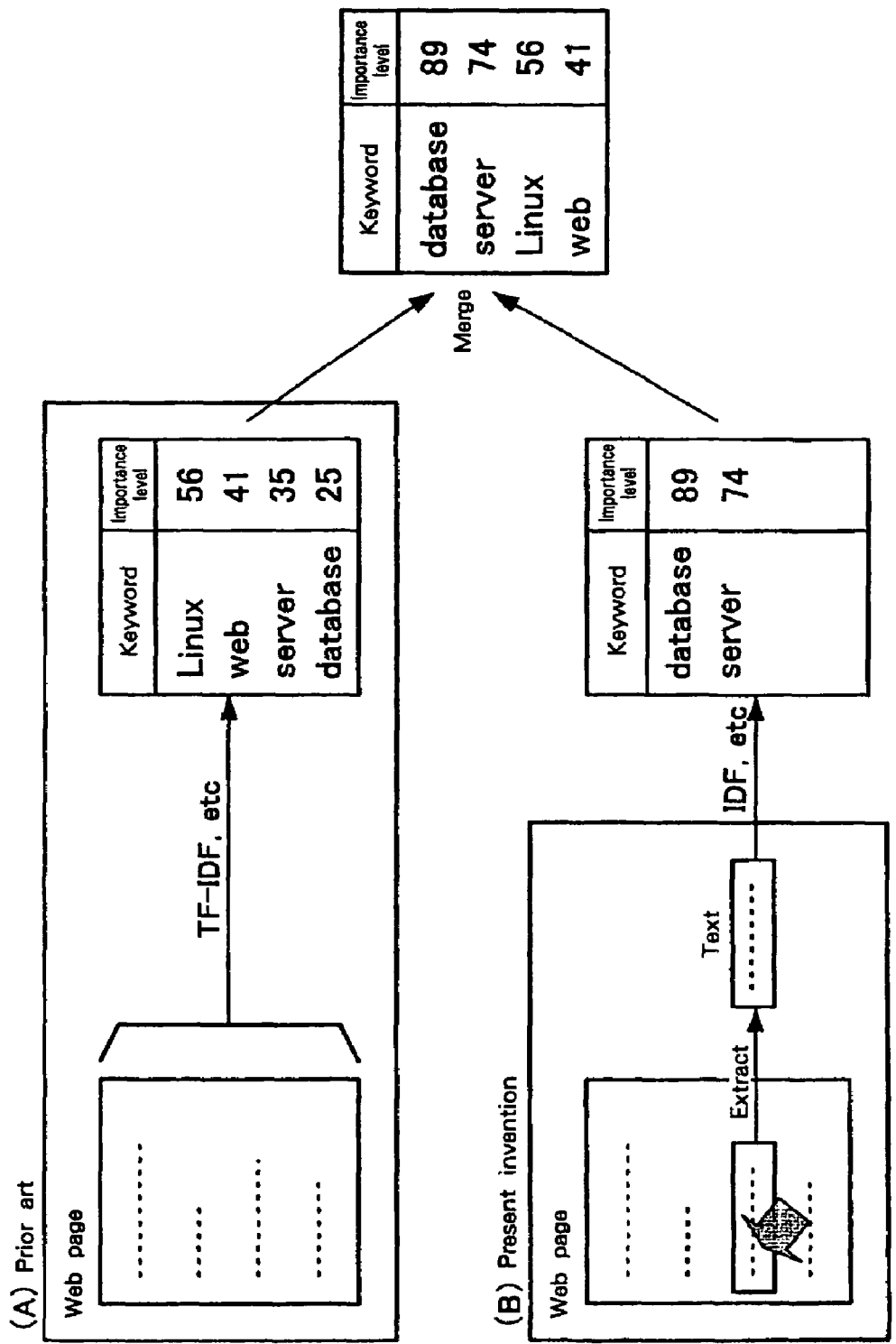
FIG. 13 is a diagram showing a comparison between the example embodiment of the present invention and the prior art when the text extracted in this embodiment is employed to generate a keyword vector for a search engine.

FIG. 13 is a diagram showing a comparison of the embodiment with the prior art in the process for employing obtained text to generate a keyword vector (a selected keyword and the weighting that represents its importance level) for a search engine. Using the conventional method, keywords included in the overall page are weighted using, for example, the TF·IDF method, and an important keyword is extracted. In this embodiment, however, the keyword weighting process is performed for the text that is a target for a user's operation. For the weighting of keywords, a conventional method, such as the IDF method in the TF·IDF method, can be employed. While the keyword vector that is generated based on the text obtained in this embodiment can be employed by itself for services, such as research performed to ascertain web audience rates and a reduction in the search conditions for a search engine. Further, as is shown in FIG. 13, the keyword vector can also be employed with a keyword vector that is conventionally generated.

In the four modes, the transmission destination of the extracted text is not limited to those described above, and the extracted text can be transmitted to various users who are permitted to use it. For example, in the mode in FIG. 9, the extracted text may be transmitted to the creator of the web contents 101 in which the script 102 is embedded. Furthermore, in the modes in FIGS. 11 and 12, the extracted text may be transmitted to a server that is provided separate from the proxy server 130 or the portal site 140, and that uses the extracted text to provide a service.

In this embodiment, text is extracted from web contents based on a user's operation. However, text may be extracted from document data having another arbitrary form. In this case, an area for monitoring the movement of a mouse may be set up not only on a screen whereon web contents are displayed by a web browser, but also various other areas, such as the entire screen of a display device for of a computer or an area in a window that is displayed by an application program.

In addition, based on a user's operation performed for an object, such as an image other than text, the information for the target object can be extracted. In this case, the operation that is defined as one the user unintentionally performs for an interesting object is the selection of an object, which is performed in the same manner as is the selection of text, the pointing to a line, or clicking.

Moreover, input means other than the mouse or another pointing device may be employed to define the operation that a user unintentionally performs for an interesting object. A specific operation can be defined in accordance with, for example, the manipulation of a cursor key, voice input when the user reads text on a display, or the movement of a user's eyes.

Advantages of the Invention

As is described above, according to the present invention, while informative input by a user is not required, detailed information concerning a web content portion that the user is interested in can be obtained. Further, a detailed record of a user's operation, including a the manipulation of objects on a web browser display, can be extracted, and can be used as information indicating the trend of the user's interest.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A computer-implemented information processing apparatus comprising:
    browsing means implemented by a computer device, for receiving and displaying document data, said document data corresponding to a downloaded document including one or more executable scripts;
    operation detection means implemented by said browsing means executing a first of said one or more executable scripts, for employing an input operation, performed by a user when said user browses said document data displayed by said browsing means, to detect an operation defined as a specific operation that said user unintentionally performed to obtain interesting information; and
    character string extraction means implemented by said browsing means executing a second of said one or more executable scripts, for extracting a character string that is displayed at a location whereat said specific operation that is detected by said operation detection means is performed on a display screen of said browsing means, wherein the specific operation comprises an operation selected from all of the group of operations of selecting of text, pointing to a link, clicking on a link, tracing and reading in a transverse horizontal direction detected in accordance with the user's movement of a pointer in a transverse direction that matches the direction of horizontally oriented lines of text of a displayed document or transverse movement of the pointer perpendicular to vertically oriented lines, and, tracing and reading in a vertical direction detected in accordance with user's movement of the pointer perpendicular to the horizontally oriented lines and movement of the pointer that matches the direction of vertically oriented lines of text of a displayed document.

2. A character string extraction method comprising the steps of: detecting a predetermined, specific operation based on an input operation performed by a user on a display screen on which document data are displayed, said document data corresponding to a downloaded document including one or more executable scripts, said detecting performed by implementing a first executable script, in said document data; and
    extracting, as a unit, a sentence or a line that includes a character string that is displayed at a location whereat said specific operation that is detected has been performed on said display screen, wherein the specific operation comprises an operation selected from all of the group of operations of selecting of text, pointing to a link, clicking on a link, tracing and reading in a transverse horizontal direction detected in accordance with the user's movement of a pointer in a transverse direction that matches the direction of horizontally oriented lines of text of a displayed document or transverse movement of the pointer perpendicular to vertically oriented lines, and, tracing and reading in a vertical direction detected in accordance with user's movement of the pointer perpendicular to the horizontally oriented lines and movement of the pointer that matches the direction of vertically oriented lines of text of a displayed document, said extracting performed by implementing a second executable script.

3. The character string extraction method according to claim 2, wherein, as a result of tracing and reading movement by which the pointer of a pointing device is moved by a user along lines in a document that is displayed, said step of extracting a character string, a sentence or a line includes extracting a character string belonging to a document immediately above a character string selected using said pointer.

4. A storage medium on which the input means of a computer stores a computer-readable program such that, when executed by a processor device, permits said computer to perform:
    a process for displaying the contents of document data, said document data corresponding to a downloaded document including one or more executable scripts;
    an process for detecting a predetermined specific operation based on a user's operation on a display screen where said document data are displayed, said detecting performed by implementing, a first executable script in said document data; and
    a process for extracting a character string that is displayed at a location whereat said specific operation that is detected is performed on said display screen, wherein the specific operation comprises an operation selected from all of the group of operations of selecting of text, pointing to a link, clicking on a link, tracing and reading in a transverse horizontal direction detected in accordance with the user's movement of a pointer in a transverse direction that matches the direction of horizontally oriented lines of text of a displayed document or transverse movement of the pointer perpendicular to vertically oriented lines, and, tracing and reading in a vertical direction detected in accordance with user's movement of the pointer perpendicular to the horizontally oriented lines and movement of the pointer that matches the direction of vertically oriented lines of text of a displayed document, said extracting performed by implementing a second executable script.

5. An article of manufacture comprising a computer storage medium having computer readable program code means embodied therein for causing character string extraction, the computer readable program code means in said article of manufacture comprising computer readable program code means for causing a computer to effect the steps of
    detecting a predetermined, specific operation based on an input operation performed by a user on a display screen on which document data are displayed, said document data corresponding to a downloaded document including one or more executable scripts, said detecting performed by implementing a first executable script in said document data; and
    extracting, as a unit, a sentence or a line that includes a character string that is displayed at a location whereat said specific operation that is detected has been performed on said display screen, wherein the specific operation comprises an operation selected from all of the group of operations of selecting of text, pointing to a link clicking on a link, tracing and reading in a transverse horizontal direction detected in accordance with the user's movement of a pointer in a transverse direction that matches the direction of horizontally oriented lines of text of a displayed document or transverse movement of the pointer perpendicular to vertically oriented lines, and tracing and reading in a vertical direction detected in accordance with user's movement of the pointer perpendicular to the horizontally oriented lines and movement of the pointer that matches the direction of vertically oriented lines of text of a displayed document, said extracting performed by implementing a second executable script.

* * * * *